Sept. 3, 1935.  P. W. BEGGS  2,013,433

STEAM TRAP

Filed Oct. 10, 1932

Witness:
V. Siljander

Inventor
Paul W. Beggs
By: Hill & Hill
Attys.

Patented Sept. 3, 1935

2,013,433

UNITED STATES PATENT OFFICE 2,013,433

STEAM TRAP

Paul W. Beggs, Chicago, Ill., assignor to Jas. P. Marsh Corporation, Chicago, Ill., a corporation of Illinois Application October 10, 1932, Serial No. 637,140

2 Claims. (Cl. 236—53)

The invention relates to traps and primarily to that type which is capable of association and use with heating or other systems and operates to allow the escape of noncondensable gases therefrom and to trap condensate and discharge same after a predetermined amount of condensate has accumulated in the trap.

It is one of the prime objects of the invention to arrange the elements of the structure relatively to each other so that a compact device is produced which thus permits a device such as above referred to, to be employed in instances now prohibited.

It is an object of the invention to provide a trap with means for trapping and controlling the flow of condensate therefrom, having temperature responsive means combined therewith which functions to permit the escape of steam, yet will allow the escape of air and non-condensable gases until this is prohibited by the temperature of the steam.

It is an object of the invention to provide a fitting having elements, each of which has a passage, one of said elements having a valve portion through which liquid may flow from the device to and through the outlet opening thereof, the other element of the fitting having an air passage which provides a guide for an element for actuating a valve element which cooperates with said valve portion.

It is another object of the invention to employ a structure such as that just referred to and combine a temperature responsive means therewith, the latter being arranged relatively to the element having the air passage so that the temperature responsive means may function to control the passage of air through said passage.

In addition to the above, it is an object to provide means for adjusting the temperature responsive means so that the temperature responsive means may be arranged to regulate escape of air through the air passage.

The invention has these and other objects, all of which will be explained in detail and more readily understood when read in conjunction with the accompanying drawing which illustrates one embodiment of which the invention is susceptible, it being manifest that changes and modifications may be resorted to without departing from the spirit of the appended claims forming a part hereof.

Figure 1:
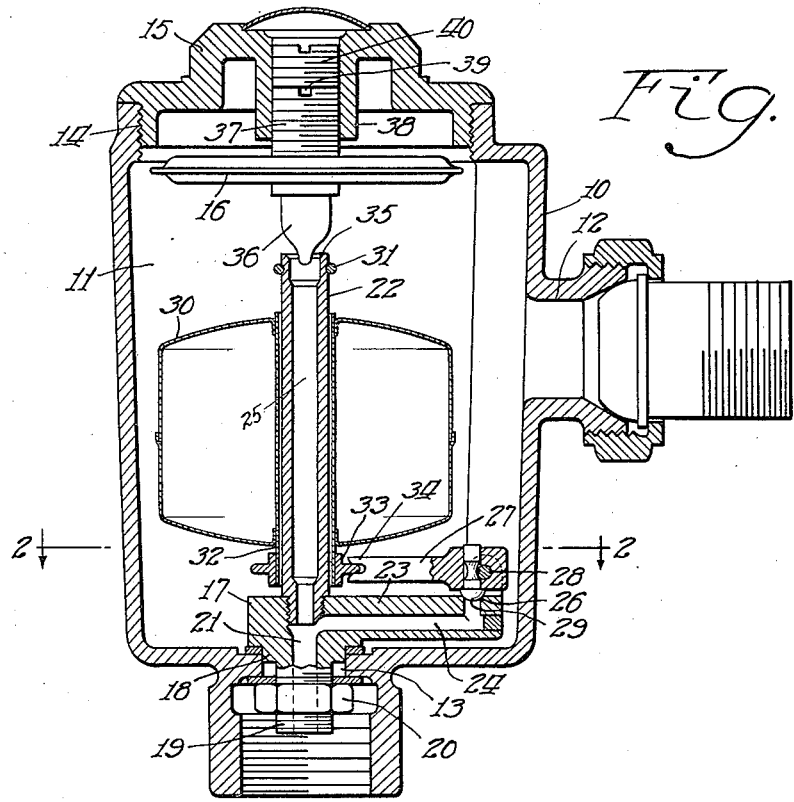
Fig. 1 is a central longitudinal section of a trap embodying the invention.
Figure 2:
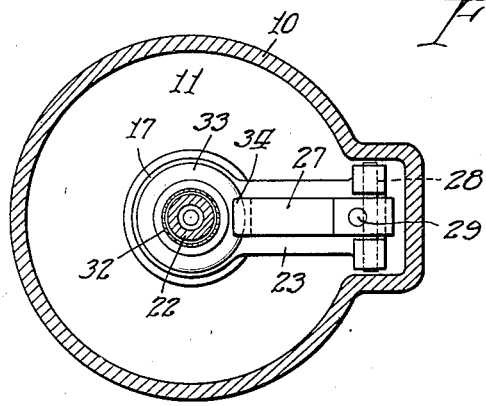
Fig. 2 is a section taken on line 2—2 of Fig. 1 looking in the direction of the arrows.

The structure illustrated contemplates the utilization of a hollow element 10 which forms a chamber 11 having a fluid inlet opening 12 and a fluid outlet opening 13. The member 10 is further provided with a threaded opening 14 for the reception of a cap or closure 15 which provides means for supporting a temperature responsive device such as 16.

The structure contemplates the use of a fitting generally designated 17 having a boss 18 and a threaded extension 19, the boss being adapted to be located in the outlet opening 13 and be held therein by means of a nut 20 which is threaded upon the extension 19 to hold the fitting 17 within the chamber 11. It is understood that the threaded portion 19 of the fitting is provided with a passage 21 which communicates with the outlet opening generally designated 13.

The fitting 17 is comprised of a vertically extending tubular air vent member or element 22 and a horizontally extending drain member or element 23. The element 23 has a fluid passage 24 formed therein which communicates with the passage 21 of the threaded extension 19. It will be noted that the vertically disposed element 22 is of tubular formation and thus provides a passage 25 which also communicates with the passage 21 provided in the threaded extension 19. The element 23 is provided with a valve seat 26 and in addition thereto provides a support for a lever 27 which is pivoted at 28 and is provided with a valve element 29 which cooperates with the valve seat 26 formed in the element 23.

A float 30 is supported for movement longitudinally of the element 22, the float being limited in its movement in one direction through the agency of a stop 31 secured to said element 22. The float 30 has a tubular extension 32 and this extension has an annular flange 33 which is designed to be located in the forked end 34 of the lever 27 to thus form a connection between this lever 27 and the float which manifestly will, upon movement of the float longitudinally of the tubular element 22, transmit this motion to the valve element 29 and move same toward and away from the opening or valve seat 26 and will thereby regulate the amount of fluid flowing through the passage 24 from the chamber 11.

The upper end of the tubular element 22 is formed to provide a valve seat 35 with which the valve element 36 is adapted to cooperate to regulate the flow of air from the chamber 11 through the passage 25 and through the outlet 13. This valve element 36 is part of the temperature responsive device generally designated 16 which is susceptible to temperature changes of the fluid contained in the chamber 11 and therefore will function to open and close the valve formed by the valve portions 35 and 36 and may function to completely close the valve when the temperature of the fluid such as steam entering the chamber 11 is sufficiently high to cause this actuation. Manifestly, when steam of a certain temperature enters the chamber 11, the temperature responsive means 16 will expand and function to close the valve just referred to and trap the steam in the chamber 11.

The temperature responsive device generally designated 16 has a threaded extension 37 which is threadedly connected with the inwardly projecting boss 38. It will be noted that the threaded projection 37 is provided with a slot 39 and, therefore, will accept a screw driver or other similar instrument and thus allow the temperature responsive means generally designated 16 and the valve element 36 to be moved with respect to the valve seat 35 and thereby regulate the valve element 36 so that it may function at different temperatures. A set nut 40 is also employed to hold the temperature responsive device in any one of its adjusted positions.

From the foregoing description of the structure, it is believed evident that a simple and compact device is produced which will function to trap condensate therein and which when the quantity thereof reaches a certain predetermined amount, will operate to discharge or release the condensate therefrom. It is also manifest that the temperature responsive element will function to allow the escape of fluid such as air or non-condensible gases from the chamber 11 and that as steam is introduced to the chamber 11, this temperature responsive element will be actuated and function to prevent the further escape of air from the chamber.

It will be noted that the float 30 is mounted for operation along the element 22 and that this element 22 is connected with the element 23 as is the arm 27 and thus a unit is provided which may be readily introduced and removed from the chamber 11 and be mounted in the outlet opening 13 and held in functionally operative position within the chamber.

Having thus described my invention, what I claim and desire to cover by Letters Patent is:

1. In a device of the class described, the combination of a housing having inlet and outlet ports formed therein, a drain member mounted in said housing and having a passage communicating with the interior thereof and with said outlet port, a valve seat adjacent one end of said drain member, an arm pivotally mounted on said member adjacent said seat, a valve mounted on said arm and cooperable with said seat, a tubular air vent member mounted in said drain member and having a passage communicating with the passage formed in the drain member, a float slidably mounted on said vent member and operatively related to said arm for actuating said valve, and temperature responsive means mounted in said housing and operatively related to said vent member for closing the passage therethrough.

2. In a device of the class described, the combination of an open ended housing having inlet and outlet ports formed therein, a drain member mounted in said housing and having a horizontally disposed passage communicating with the interior of the housing and with said outlet port, a closure for the open end of said housing, a valve seat adjacent one end of said drain member, an arm pivotally mounted on said member adjacent said seat, a valve mounted on said arm adjacent its pivotal connection and cooperable with said seat, a tubular air vent mounted in said drain member and having a passage communicating with the passage formed in the drain member, a float slidably mounted on said vent member and operatively related to the free end of said arm for actuating said valve, and temperature responsive means adjustably mounted in said closure and operatively related to said vent member for closing the passage therethrough.

PAUL W. BEGGS.